US008416082B2

(12) United States Patent
Sayegh et al.

(10) Patent No.: US 8,416,082 B2
(45) Date of Patent: Apr. 9, 2013

(54) ARTICLE SURVEILLANCE TAG

(75) Inventors: Adel O. Sayegh, Rancho Cucamonga, CA (US); Edgardo Redublo, Chino Hills, CA (US); Weiliang Tong, Hangzhou (CN); Mingxing Chen, Hangzhou (CN)

(73) Assignee: Universal Surveillance Corporation, Rancho Cucamonga, CA (US)

( * ) Notice: Subject to any disclaimer, the term of this patent is extended or adjusted under 35 U.S.C. 154(b) by 324 days.

(21) Appl. No.: 12/816,349

(22) Filed: Jun. 15, 2010

(65) Prior Publication Data

US 2011/0140894 A1 Jun. 16, 2011

Related U.S. Application Data

(60) Provisional application No. 61/186,993, filed on Jun. 15, 2009.

(51) Int. Cl.

| | |
|---|---|
| ***G08B 13/14*** | (2006.01) |
| ***B65D 63/00*** | (2006.01) |
| ***B65D 67/02*** | (2006.01) |
| ***B65D 55/14*** | (2006.01) |
| ***F16L 33/00*** | (2006.01) |
| ***F16L 3/22*** | (2006.01) |
| ***F16L 3/08*** | (2006.01) |
| ***F16L 3/12*** | (2006.01) |
| ***E05B 73/00*** | (2006.01) |
| ***E05B 75/00*** | (2006.01) |
| ***E05B 65/00*** | (2006.01) |
| ***E05B 65/48*** | (2006.01) |
| ***E05B 65/52*** | (2006.01) |

(52) U.S. Cl. ............... 340/572.8; 340/572.1; 340/572.2; 340/572.9; 24/16 PB; 24/17 AP; 70/14; 70/16; 70/18; 70/19; 70/57.1; 70/63; 248/68.1; 248/74.1; 248/74.3

(58) Field of Classification Search ............... 340/572.1, 340/572.2, 572.8, 572.9; 24/16 PB, 17 AP; 70/14, 16, 18, 19.57, 1.63; 248/68.1, 74.1, 248/74.3
See application file for complete search history.

(56) References Cited

U.S. PATENT DOCUMENTS

| | | | | |
|---|---|---|---|---|
| 1,796,341 A * | 3/1931 | Otten | .................................. | 63/3 |
| 2,119,436 A * | 5/1938 | Lauff | .................................. | 63/4 |
| 2,595,264 A * | 5/1952 | Jespersen | .......................... | 24/176 |
| 3,293,846 A * | 12/1966 | Pauli | ................................ | 368/10 |
| 3,748,672 A * | 7/1973 | Patrick et al. | .................. | 441/131 |
| 4,380,097 A * | 4/1983 | Keifer | ............................ | 70/57.1 |
| 4,825,156 A * | 4/1989 | Read | ............................. | 324/166 |
| 5,099,662 A * | 3/1992 | Tsai | .................................. | 70/16 |
| 5,291,761 A * | 3/1994 | Lii | .................................... | 70/18 |
| 5,555,655 A * | 9/1996 | Yager et al. | ..................... | 40/306 |

(Continued)

*Primary Examiner* — Daniel Wu
*Assistant Examiner* — Kam Ma
(74) *Attorney, Agent, or Firm* — Milord A. Keshishian

(57) ABSTRACT

A housing comprised of substantially arced configured first and second pieces pivotally coupled with one another to form an enclosure that defines a substantially circular-cylindrical hole for encompassing and securing an article therein. The housing includes a magnetic switch for resetting an internal alarm system of the EAS alarm tag to OFF, an interlocking sensor switch and an auxiliary sensor switch for arming the EAS alarm tag. When both the interlock sensor switch and the auxiliary sensor switch are closed, the internal alarm system of the EAS alarm tag is armed and set to ON, and if any one of the interlocking sensor switch and the auxiliary sensor switch is tampered, an alarm (external the EAS alarm tag and or) of the EAS alarm tag is triggered.

16 Claims, 16 Drawing Sheets

U.S. PATENT DOCUMENTS

| | | | | |
|---|---|---|---|---|
| 5,660,064 | A * | 8/1997 | Ecker et al. | 70/16 |
| 5,904,442 | A * | 5/1999 | Takeda | 403/392 |
| 6,684,666 | B1 * | 2/2004 | Taper | 70/16 |
| 7,259,669 | B2 * | 8/2007 | Cargonja et al. | 340/539.18 |
| 7,259,674 | B2 * | 8/2007 | Marsilio et al. | 340/572.1 |
| 7,394,376 | B1 * | 7/2008 | Sayegh et al. | 340/572.1 |
| 7,404,484 | B2 * | 7/2008 | Farrar et al. | 206/308.1 |
| D596,520 | S * | 7/2009 | Sayegh et al. | D10/106.92 |
| 7,595,733 | B2 * | 9/2009 | Spagna | 340/572.8 |
| 7,650,768 | B2 * | 1/2010 | Fawcett et al. | 70/58 |
| 7,878,033 | B2 * | 2/2011 | Fawcett et al. | 70/58 |
| 8,044,806 | B2 * | 10/2011 | Sayegh | 340/572.9 |
| 8,294,583 | B2 * | 10/2012 | Sayegh et al. | 340/572.9 |
| 2003/0055671 | A1 * | 3/2003 | Nassar | 705/1 |
| 2005/0268672 | A1 * | 12/2005 | Fraser et al. | 70/57.1 |
| 2006/0170559 | A1 * | 8/2006 | Marsilio et al. | 340/572.9 |
| 2007/0152836 | A1 * | 7/2007 | Nagelski et al. | 340/572.9 |
| 2007/0163309 | A1 * | 7/2007 | Fawcett et al. | 70/57.1 |
| 2007/0247313 | A1 * | 10/2007 | Marsilio et al. | 340/572.1 |
| 2007/0272686 | A1 * | 11/2007 | Yu | 220/4.02 |
| 2008/0030334 | A1 * | 2/2008 | Marsilio et al. | 340/572.1 |
| 2008/0048868 | A1 * | 2/2008 | Chua et al. | 340/572.8 |
| 2008/0148788 | A1 * | 6/2008 | Ham et al. | 70/16 |
| 2008/0230509 | A1 * | 9/2008 | Koo et al. | 215/386 |
| 2008/0284601 | A1 * | 11/2008 | Sayegh et al. | 340/572.1 |
| 2008/0289372 | A1 * | 11/2008 | Rendon et al. | 70/57.1 |
| 2010/0005840 | A1 * | 1/2010 | Hogan et al. | 70/63 |
| 2010/0060460 | A1 * | 3/2010 | Zinner | 340/572.9 |
| 2010/0242552 | A1 * | 9/2010 | Sayegh et al. | 70/58 |
| 2010/0287998 | A1 * | 11/2010 | Anderson et al. | 70/57.1 |
| 2011/0140894 | A1 * | 6/2011 | Sayegh et al. | 340/572.8 |
| 2011/0273295 | A1 * | 11/2011 | Sayegh et al. | 340/572.1 |
| 2012/0031153 | A1 * | 2/2012 | Conti | 70/14 |
| 2012/0073336 | A1 * | 3/2012 | Thoonsen | 70/19 |
| 2012/0151974 | A1 * | 6/2012 | Zhang et al. | 70/63 |
| 2012/0152883 | A1 * | 6/2012 | Zhang et al. | 215/201 |
| 2012/0168398 | A1 * | 7/2012 | Zhang et al. | 215/201 |

* cited by examiner

ARTICLE SURVEILLANCE TAG

CROSS-REFERENCE TO RELATED APPLICATIONS

This application claims the benefit of priority of the co-pending U.S. Utility Provisional Patent Application No. 61/186,993, filed Jun. 15, 2009, the entire disclosure of which is expressly incorporated by reference herein.

BACKGROUND OF THE INVENTION (1) Field of the Invention

This invention relates to article surveillance systems and, more particularly, to an electronic article surveillance (EAS) system tag with an auxiliary alarm triggering mechanism.

(2) Description of Related Art

It is a common practice for retail stores to tag articles to prevent theft of the article by shoplifters. There are several methods of tagging articles or merchandise, most common of which is attaching a marker that triggers an EAS security system causing it to alarm. Markers and tags are secured to the article in several different ways. These markers or tags are sometimes stuck onto the article or merchandise, making it easy for shoplifters to remove these tags and rendering the article unsecured and unprotected. Some articles are source-tagged where the markers are attached to articles while the article is in its last phase of packaging. Some conventional tags already existent in the market allow elongated substantially cylindrical articles to be protected through the use of tags that trigger an external electronic article surveillance system. These tags however, are passive in that they do not have self-alarming capabilities and cannot (themselves) be triggered by the electronic article surveillance system of a retail store. A non-limiting example of elongated substantially cylindrical articles may, for example, be a baseball bat.

Accordingly, there remains a long standing and continuing need for an advance in the art of EAS and theft deterrent tags that makes the tags more compatible for use with impenetrable objects, more difficult to defeat, simpler in both design and use, more economical and efficient in their construction and use, and provide a more secure and reliable engagement of the article to be monitored.

BRIEF SUMMARY OF THE INVENTION

An exemplary optional aspect of the present invention provides an anti-theft tag, comprising:

- a housing comprised of a first piece and a second piece movably coupled with one another, forming an enclosure; and
- a marker accommodated within the housing.

Still another exemplary optional aspect of the present invention provides anti-theft tag, wherein:

- the first piece and the second piece enclose to define a hole for encompassing and securing an article therein the hole.

Yet another exemplary optional aspect of the present invention provides anti-theft tag, wherein:

- the first piece and the second piece have a substantially arced configuration that enclose to define a substantially cylindrical hole.

A further exemplary optional aspect of the present invention provides anti-theft tag, wherein:

- the respective first and the second pieces are pivotally coupled by a hinge mechanism that allows rotation of the respective pieces along a first reciprocating path.

Yet a further exemplary optional aspect of the present invention provides anti-theft tag, wherein:

- the hinge mechanism is comprised of
- a set of integrally circular, hollow sections that form knuckles of the hinge mechanism, with the knuckles integral with a first distal end of first piece;
- a hinge barrel integral with the a second distal end of the second piece;
- wherein the hinge barrel is axially aligned in between the knuckles, through which a hinge pin in inserted to couple the knuckles with the hinge barrel to form the hinge mechanism;
- wherein the hinge pin inserted through the hollow knuckles at a distal open end of the first piece, the through-hole of the barrel, and into a closed end of the first piece.

Still a further exemplary optional aspect of the present invention provides anti-theft tag, wherein:

- a protective friction pad is coupled with the housing for minimizing movement of the anti-theft tag in relation to an associated article.

Another exemplary optional aspect of the present invention provides anti-theft tag, wherein:

- the protective friction pad is comprised of a first friction pad coupled with the first piece and a second friction pad coupled with the second piece.

Yet another exemplary optional aspect of the present invention provides anti-theft tag, wherein:

- the protective friction pad includes a top surface that is striated, having parallel, protruded strips with axial lengths that are longitudinally parallel along a central axial length of the cylindrical hole for an improved grip of an article.

Still another exemplary optional aspect of the present invention provides anti-theft tag, wherein:

- the first piece includes a first opening defined through a first section at a third distal end;
- the first piece further includes a second section at the first distal end that includes a second opening that accommodates a detector mechanism;
- the second piece includes an actuator mechanism at a third section proximal the second distal end that actuates the detector mechanism;
- the second piece further includes a free leading end at a fourth section at a fourth distal end that is inserted within and received by the first opening;
- with the detector mechanism of the first piece and the actuator mechanism of the second piece aligned proximal the hinge mechanism at the respective first distal end of the first piece and the second distal end of the second piece; and
- when the first piece and the second piece move along the first reciprocating path and close, the actuator mechanism actuates the detector mechanism.

A further exemplary optional aspect of the present invention provides anti-theft tag, wherein:

- an exterior surface of the first piece includes perforated areas that form grill-openings for output of an audio indicator sound, a visual indicator aperture for viewing of a visual indicator device, and a protuberance in a form of a frustum of a right-circular cone that houses a lock mechanism for locking the second piece with the first piece.

Still a further exemplary optional aspect of the present invention provides anti-theft tag, wherein:

- the free leading end is an engaging element that includes an interlocking aperture into which a locking probe of a lock mechanism is received and has a leading beveled surface that converges into a beveled tip that facilitates coupling of the free leading end with the first piece.

Another exemplary optional aspect of the present invention provides anti-theft tag, wherein:

the free leading end is inserted into the first opening defined through the first section at the third distal end of the first piece, with the locking probe of the lock mechanism interlocked with the interlocking aperture of the free leading end.

Yet another exemplary optional aspect of the present invention provides anti-theft tag, wherein:

the first piece further includes a chamber that accommodates and locks the free leading end of the second piece;

the chamber accommodates the lock mechanism that interlocks with the free leading end of the second piece;

the lock mechanism is partially housed within the protuberance, in a form of a frustum of a right-circular cone, locking the second piece with the first piece.

Still another exemplary optional aspect of the present invention provides anti-theft tag 3, wherein:

the lock mechanism includes:

a resilient member that is integral with the locking probe that forces the locking probe towards the engaging element to lock the engaging element within the chamber of the first piece;

the resilient member includes a biasing mechanism that forces the locking probe towards the engaging element;

the locking probe includes an engaging tip that is biased to a protruded position, contacts the leading beveled surface of the engaging element, is forced to a partially retracted position, and is eventually released to a fully protruded position into the interlocking aperture of the free leading end, whereby the engaging tip interlocks with engaging element such that insertion into first piece is allowed, but extraction is not.

A further exemplary optional aspect of the present invention provides anti-theft tag, further including:

a disengagement arrangement, wherein:

the locking probe is retracted, released, and disengaged from the interlocked and engaged position within the interlocking aperture when the force exerted by the resilient member is removed;

the locking probe is released and disengaged from the interlock aperture when the force exerted by the resilient member is reversed, with the reversed force pulling the locking probe out and away from the interlock aperture, against the biasing mechanism of the lock mechanism.

Still a further exemplary optional aspect of the present invention provides anti-theft tag, further including:

an internal actuator that is biased to a first position;

the beveled tip of the engaging element contacts the internal actuator, pushing the internal actuator from a first position to a second position to actuate a first arming mechanism of the tag.

Another exemplary optional aspect of the present invention provides anti-theft tag, wherein:

the internal actuator includes a structure that forms a cavity that houses a biasing mechanism;

the structure includes a first segment that secures a first-end of the biasing mechanism and against which the first-end of the biasing mechanism is pushed and supported when the internal actuator is moved along a third reciprocating path;

the structure further includes a second movable segment that secures a second-end of the biasing mechanism and against which the second-end of the biasing mechanism is pushed and supported when the second movable segment of the internal actuator is moved along the third reciprocating path;

the second movable segment moves in relation to the first segment and includes:

a first wall that includes:

a first wall section that is longitudinally oriented parallel along an axial length of the cavity, followed by a second wall section oriented at an angle to the axial length of the cavity; and a third wall section that is longitudinally oriented parallel along the axial length of the cavity;

a second wall that is transversely oriented the axial length of the cavity, against which the second-end of the biasing mechanism is pushed and supported;

a third wall that is longitudinally oriented parallel the axial length of the cavity;

the first wall has a height that is longer than a height of the second and third walls, with the beveled tip of the engaging element contacting a the second wall to move the second movable segment along the third reciprocating path to set the alarm.

Yet another exemplary optional aspect of the present invention provides anti-theft tag, wherein:

an alarm is set when the a first actuating arm of a first arming mechanism contacts the first wall.

Still a further exemplary optional aspect of the present invention provides anti-theft tag, wherein:

the alarm is set when the second movable segment moves in relation to the first segment along the third reciprocating path, with the first actuating arm of the first arming mechanism that is biased to a protruded position contacts an interior side of a second wall surface is progressively forced to a partially retracted position, and is eventually closed when contacting an interior side of a first wall surface as the second movable segment moves from the first position to the second position;

wherein the mechanical biasing and interlocking interplay between various components generate a holding strength that is increased under tensile forces that attempt to separate the components from interlocking positions.

Another exemplary optional aspect of the present invention provides anti-theft tag, wherein:

the detector mechanism accommodated in the second opening of the second section of the first piece is a second arming mechanism that has a second arming actuator extending out of the second opening, and the actuator mechanism at the third section of the second piece, proximal the second distal end, when closed, actuates the second arming actuator extended out of the second opening to arm an alarm.

Another exemplary optional aspect of the present invention provides an alarm system of EAS an alarm tag, comprising:

a magnetic switch for resetting the alarm system of the EAS alarm tag to OFF;

an interlocking sensor switch for arming the EAS alarm tag; and a auxiliary sensor switch for arming the EAS alarm tag;

wherein when both the interlock sensor switch and the auxiliary sensor switch are closed, the alarm system of the EAS alarm tag is armed and set to ON; and wherein if the any one of the interlocking sensor switch and the auxiliary sensor switch is tampered, the alarm of the EAS alarm tag is triggered.

Yet another exemplary optional aspect of the present invention provides an alarm system of EAS an alarm tag, wherein:

closing of the interlocking sensor switch causes the closure of the auxiliary sensor switch to arm the EAS alarm tag.

Another exemplary optional aspect of the present invention provides a method for power management of an alarm, comprising:

providing input signals and determining if the input signals meet a predetermined condition;

if the input signals do not meet the predetermined condition, generating a low power mode operational signal to thereby reduce power usage;

if the input signals do meet the predetermined condition, then determining if a supplied power is greater than a first threshold;

if the supplied power is not greater then the first threshold, ceasing the operation of the alarm; otherwise, determining if supplied power is greater than a second threshold;

if the supplied power is not greater than a second threshold, outputting a low power supply indicator and arming the alarm; otherwise, generating indicators that the alarm is armed.

Yet another exemplary optional aspect of the present invention provides a method for power management of an alarm, further comprising:

determining if an antenna signal is received for triggering an alarm;

if an antenna signal is not received, determining if a first signal and a second signal of the input signals meet the predetermined condition and if so, periodically generating an indicator at specified time intervals that the alarm is armed; and triggering the alarm if the first signal of the input signals does not meet the predetermined condition;

if the second signal of the input signals does not meet the predetermine condition, then determining if a third signal of the input signals meets the predetermined condition and if so, resetting the alarm, otherwise, triggering the alarm;

if an antenna signal is received, triggering an alarm and determining if the second signal of the input signals meets the predetermined condition and if no, determining if the third signal of the input signals meets the predetermined condition, and if so resetting the alarm, otherwise, triggering the alarm.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

Figure 1A:
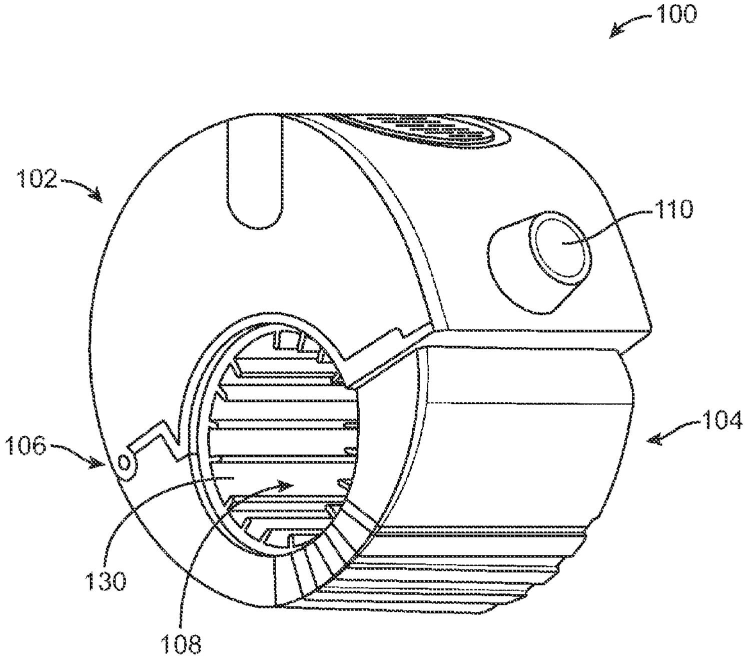
FIGS. 1A to 1C are exemplary perspective illustrations of the various views of an EAS alarm tag in closed and armed position in accordance with the present invention.
Figure 1B:
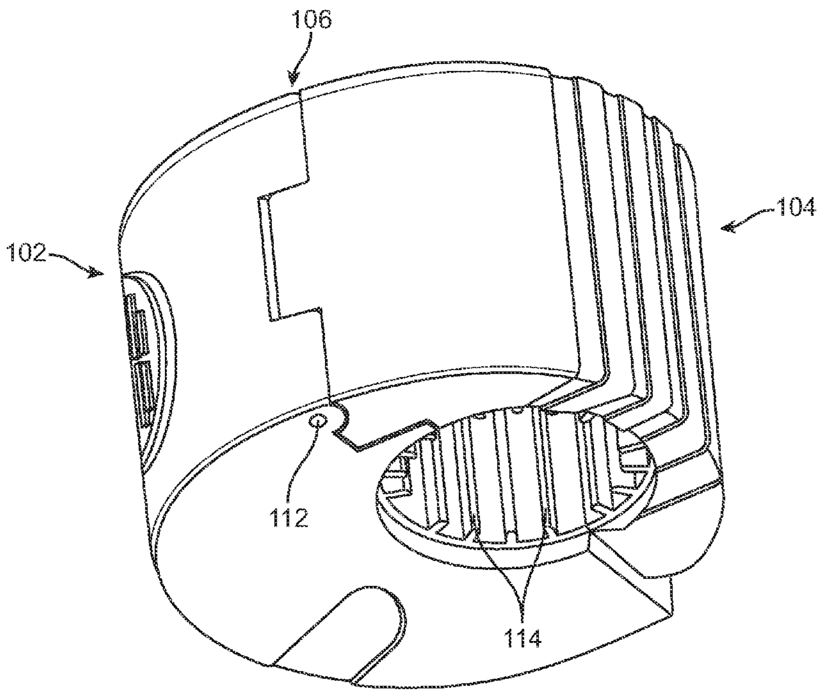
Figure 1C:
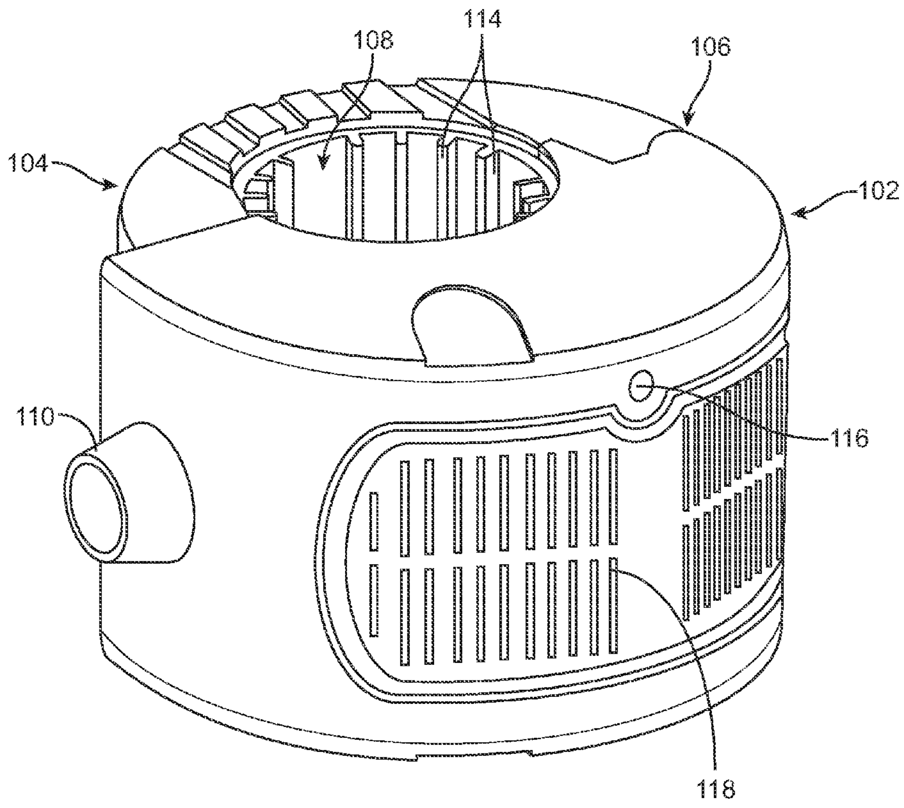

The present invention provides an EAS and theft deterrent tag that makes the tags more compatible for use with impenetrable objects, more difficult to defeat, simpler in both design and use, more economical and efficient in their construction and use, and provides a more secure and reliable engagement of the article to be monitored. FIGS. 1A to 1C are exemplary perspective illustrations of the various views of an EAS alarm tag in closed and armed position in accordance with the present invention. As illustrated in FIGS. 1A to 1C, the present invention provides an EAS alarm tag 100 that is comprised of a first piece 102 and a second piece 104 that are movably coupled with one another, forming an enclosure 108 within which an article (not shown) may be secured. As illustrated, the first piece 102 and the second piece 104 enclose to define the enclosure (or hole) 108 for encompassing and securing an article therein the hole 108. Accordingly, the present invention is made of two pieces that may be used to wrap and lock around a body of an elongated, substantially cylindrical article such as Baseball and Softball Bats and the like, when the two pieces are pressed together and closed. Non-limiting example from which the two pieces are made of include molded Acrylonitrile Butadiene Styrene (ABS) plastic sections.

In a preferred non-limiting exemplary embodiment shown, the first piece 102 and the second piece 104 have a substantially arced configuration that enclose to define a substantially cylindrical hole 108. It should be noted that other configurations for the respective first and the second piece 102 and 104 are contemplated that when enclosed, may result in or define other forms of cavity or hole. For example, a first piece and a second piece may have a substantially rectangular type form-factor (such as a shape of a bracket "[") that enclose to define a substantially rectangular-cubed hole 108 to enclose objects with surfaces that are not rounded, but flat.

Figure 2A:
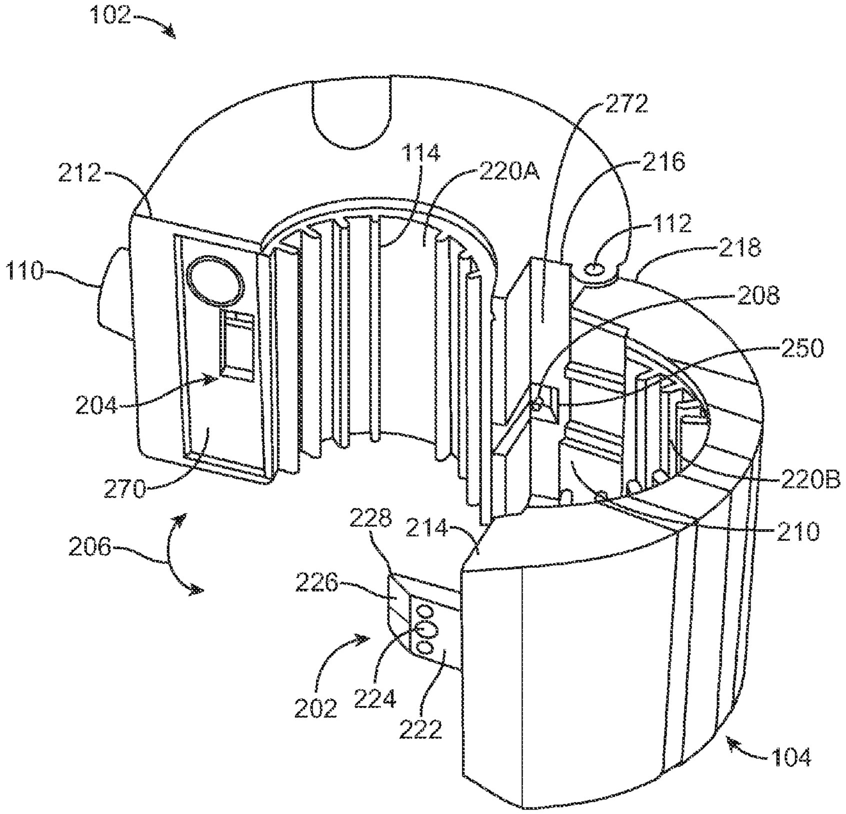
FIGS. 2A and 2B are exemplary perspective illustrations of the EAS alarm tag illustrated in FIGS. 1A to 1C, but in an open, unlocked, and unarmed position in accordance with the present invention.

As further illustrated in FIGS. 1A to 1C, the respective first and the second pieces 102 and 104 are pivotally coupled by a hinge mechanism 106 that allows rotation of the respective pieces 102 and 104 along a first reciprocating path 206 (FIG. 2A). An exterior surface of the first piece 102 includes perforated areas 118 that form grill-openings for output of an audio indicator sound, a visual indicator aperture 406 (FIG. 4) for viewing of a visual indicator device 116, and a protuberance 110 in a form of a frustum of a right-circular cone that houses a lock mechanism 348 (FIG. 3F) for locking the second piece 104 within the first piece 102.

Figure 2B:
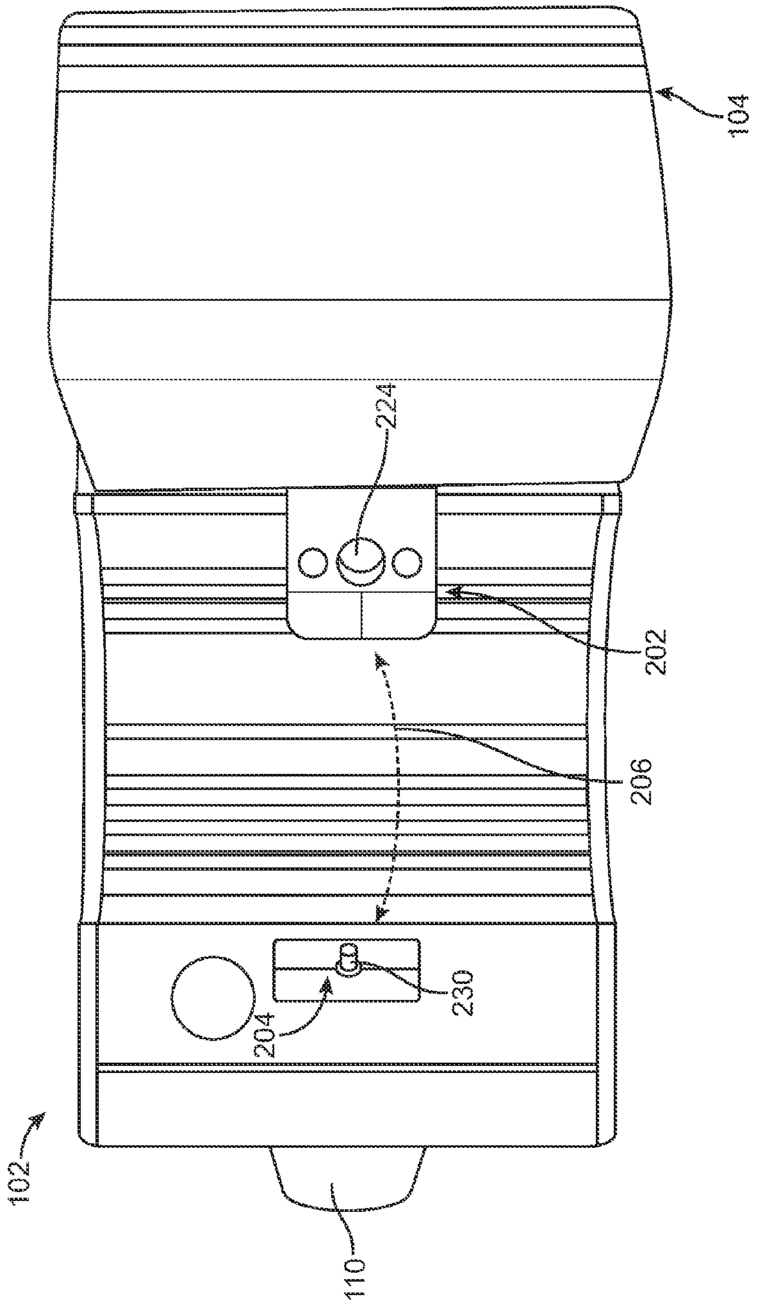

FIGS. 2A and 2B are exemplary perspective illustrations of the EAS alarm tag illustrated in FIGS. 1A to 1C, but in an open, unlocked, and unarmed position in accordance with the present invention. The EAS alarm tag 100 includes a protective friction pad 130 that is coupled with the housing of the EAS alarm tag 100 for preventing a movement of the tag 100 in relation to an associated article (not shown). The protective friction pad 130 is comprised of a first friction pad 220A coupled with the first piece 102 and a second friction pad 220B coupled with the second piece 104, forming the surface of the cylindrical cavity 108. The protective friction pad 130 includes a top surface that is striated, having parallel, protruded strips 114 with axial lengths that are longitudinally parallel along a central axial length of the cylindrical hole 108 for an improved grip of an article.

As further illustrated and stated above, the respective first and the second pieces 102 and 104 are pivotally coupled by a hinge mechanism 112 that allows rotation of the respective pieces 102 and 104 along the first reciprocating path 206. The hinge mechanism 112 is comprised of a set of integrally circular, hollow sections that form knuckles 474 (FIG. 4A) of the hinge mechanism 112, with the knuckles 474 integral with a first distal end 216 of first piece 102. The hinge mechanism 112 further includes a hinge barrel 476 (FIG. 4A) integral with the a second distal end 218 of the second piece 104, with the hinge barrel 476 axially aligned in between the knuckles 474, through which a hinge pin 502 (FIG. 4A) in inserted to couple the knuckles 474 with the hinge barrel 476 to form the hinge mechanism 112. The hinge pin 502 is inserted through the hollow knuckles at a distal open end 216 of the first piece 102, the through-hole of the barrel, and into a closed end of the first piece 102.

Figure 4A:
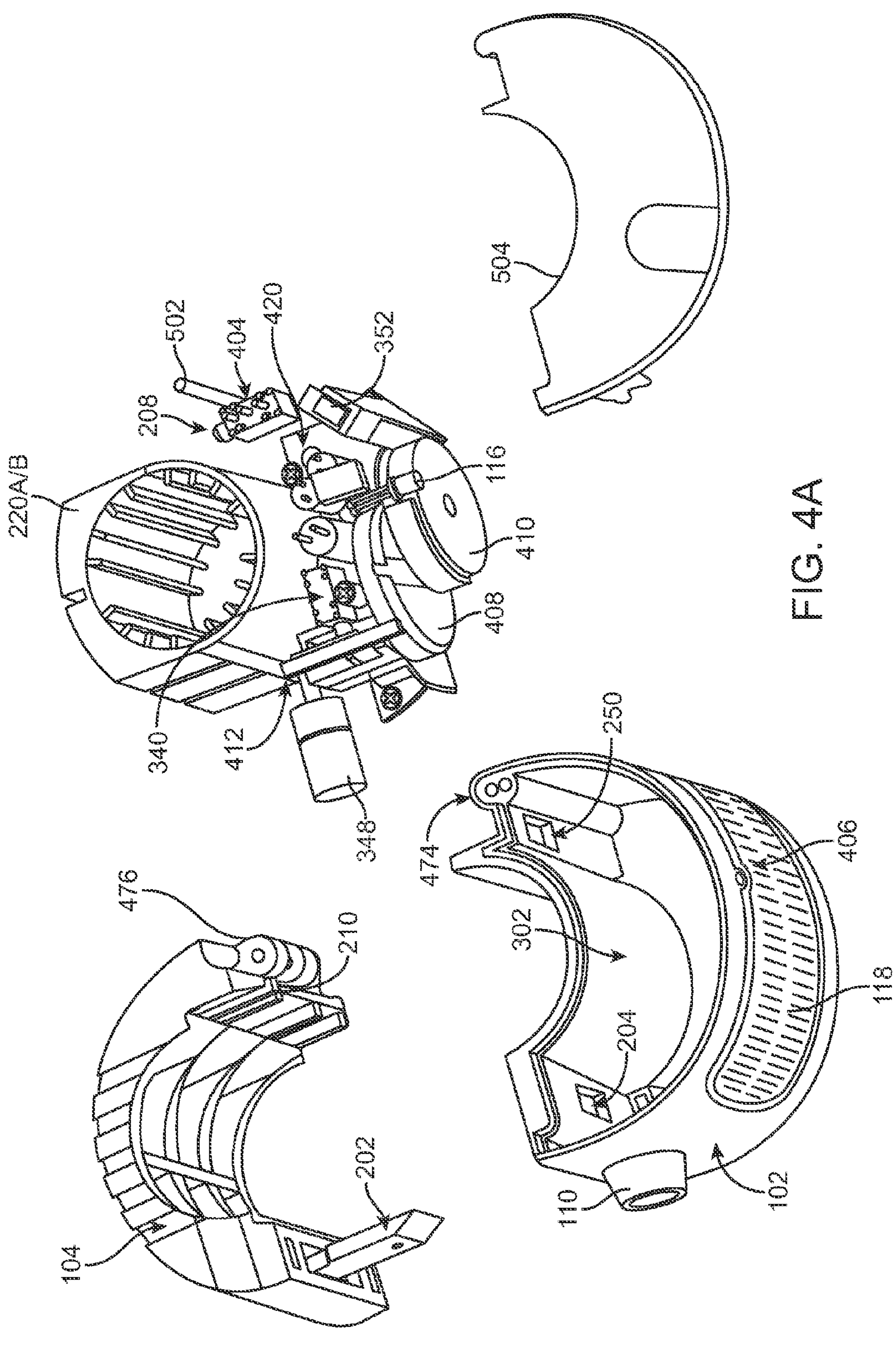
FIG. 4A is an exemplary exploded view of the EAS alarm tag illustrated in FIGS. 1A to 3F, showing the separated parts embraced by a bracket in accordance with the present invention.
Figure 4B:
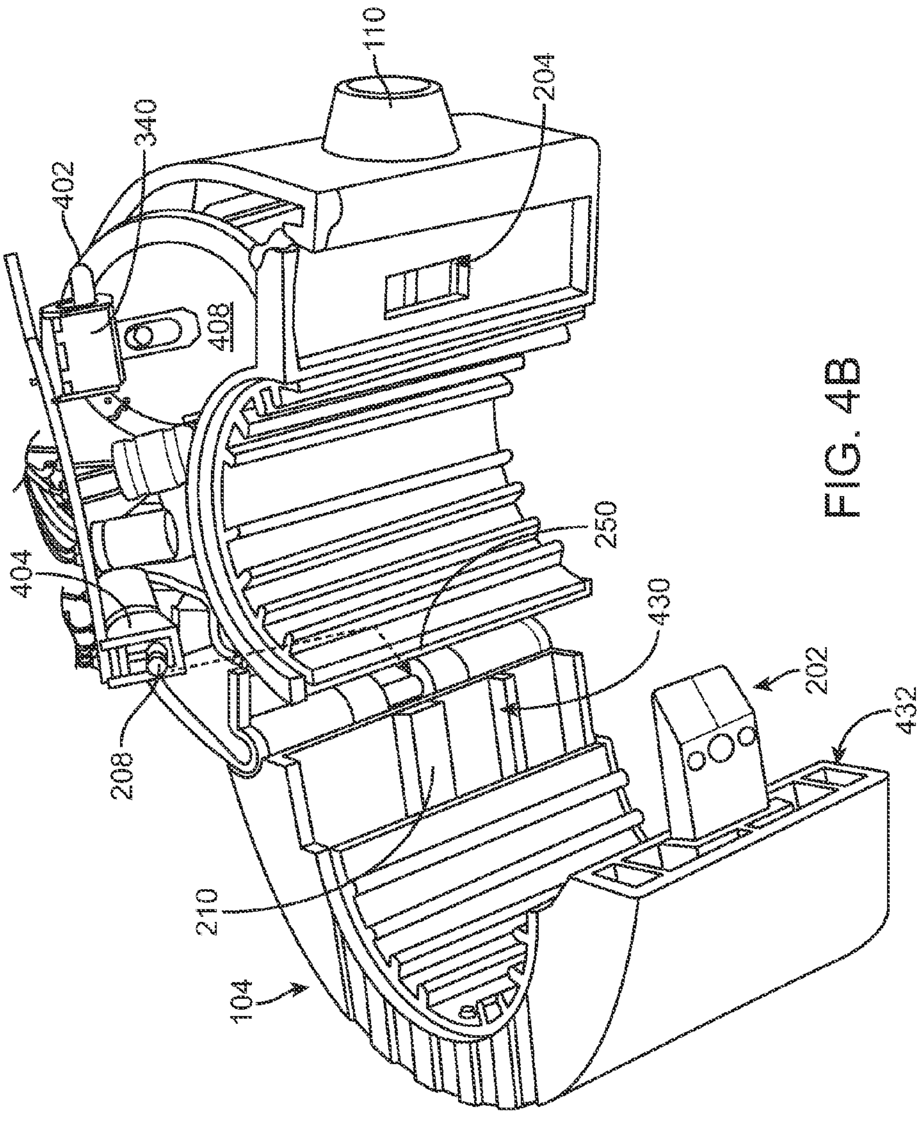
FIG. 4B exemplarily illustrates the electronics of an alarm system outside the illustrated EAS alarm tag in accordance with the present invention.

The first piece 102 of the EAS alarm tag 100 includes a first opening 204 defined through a first section 270 at a third distal end 212, and has a second section 272 at the first distal end 216 that includes a second opening 250 that accommodates a second actuating arm 208 of an inconspicuous detector mechanism 404 (FIGS. 4A and 4B). The second piece 104 includes an actuator mechanism 210 at a third section 430 (FIGS. 4A and 4B) proximal the second distal end 218 that actuates the second actuating arm 208 of the detector mechanism 404. The second piece 104 further includes a free leading end 202 at a fourth section 432 at a fourth distal end 214 that is inserted within and received by the first opening 204.

The detector mechanism 404 of the first piece 102 and the actuator mechanism 210 of the second piece 104 are aligned proximal the hinge mechanism 112 at the respective first distal end 216 of the first piece 102 and the second distal end 218 of the second piece 104. When the first piece 102 and the second piece 104 move along the first reciprocating path 206 and close, the actuator mechanism 210 actuates the second actuating arm 208 of the detector mechanism 404 to set (or arm) an internal alarm. The respective actuator and detector mechanisms 210 and 404 protect the EAS alarm tag 100 in that they alarm when the hinge mechanism 112 is tampered to separate the first piece 102 from the second piece 104. The removal of the hinge mechanism 112 will separate the first piece 102 form the second 104, enabling an article to which the EAS alarm tag 100 is coupled be released. This separation of the first and second piece 102 and 104 will trigger an alarm. Accordingly, a non-limiting function of the detector mechanism 404 is to protect against separation of the first piece 102 from the second piece 104 at the hinge of the EAS alarm tag 100. Non-limiting examples of the detector mechanism 404 for performing this function are numerous and may include, for example, the illustrated electromechanical plunger switching system, optical devices such as a photo-sensors (e.g., photodiodes, phototransistors, etc.), Infrared (IR) sensors (e.g., IR phototransistors, etc.), light sensors, magnetic or proximity sensors (e.g., Hall-effect sensors, reed switches, etc.), and so on.

As further illustrated, the free leading end 202 is an engaging element 222 that includes an interlocking aperture 224 into which a locking probe 230 of a lock mechanism 348 (FIG. 3F) is received and has a leading beveled surface 226 that converges into a beveled tip 228 that facilitates coupling of the free leading end 202 within the first piece 102. As the first piece 102 is moved along path 206 to close with the second piece 104, the free leading end 202 is inserted into the first opening 204 defined through the first section 270 at the third distal end 212 of the first piece 102, with the locking probe 230 of the lock mechanism 348 interlocked with the interlocking aperture 224 of the free leading end 202.

FIGS. 3A to 3F are exemplary illustrations of the EAS alarm tag of FIGS. 1A to 2B, with a chamber of the first piece open and visible in accordance with the present invention. The first piece 102 of the EAS alarm tag 100 includes a housing or chamber 302 that accommodates an EAS marker 352 (FIG. 4A) in addition to other electronic and mechanical components. FIGS. 3A to 3F illustrate the EAS alarm tag 100 with the electronics removed from the chamber 302 for better understanding and showing of the various mechanical interconnections. In addition, FIGS. 3A to 3F collectively illustrate a progressive closure of the first and second pieces 102 and 104, with the free leading end 202 of the second piece 104 progressively shown as being inserted into the first piece 102 and locked.

The chamber 302 of the first piece 102 accommodates a lock housing 306 of the lock mechanism 348 that fits inside of the protuberance 110, with the probe 230 of the lock mechanism 348 interlocking with the free leading end 202 of the second piece 104. The chamber 302 further houses an internal actuator mechanism 308 that functions to set (or arm) the internal alarm of the EAS alarm tag 100. The general area illustrated by the dashed line indicated generally by the reference number 304 is best illustrated in FIG. 3B, which closely illustrates the mechanical components accommodated in chamber 302.

Figure 3A:
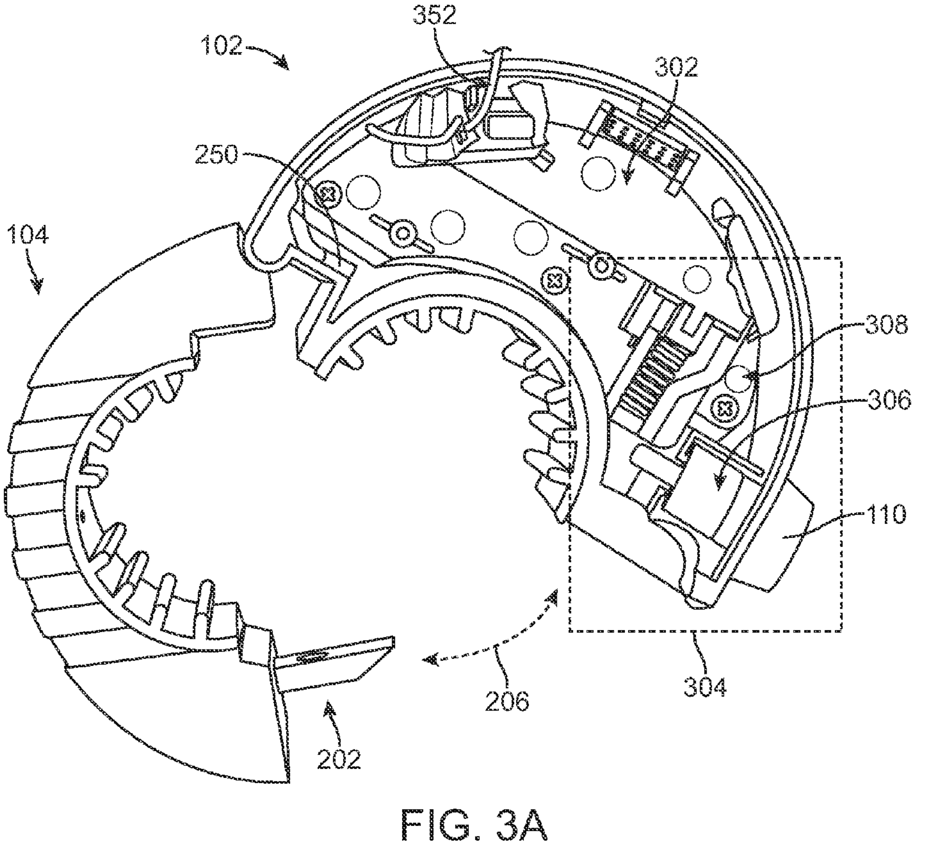
FIGS. 3A to 3F are exemplary illustrations of the EAS alarm tag of FIGS. 1A to 2B, with a chamber of a first piece open and visible in accordance with the present invention.
Figure 3B:
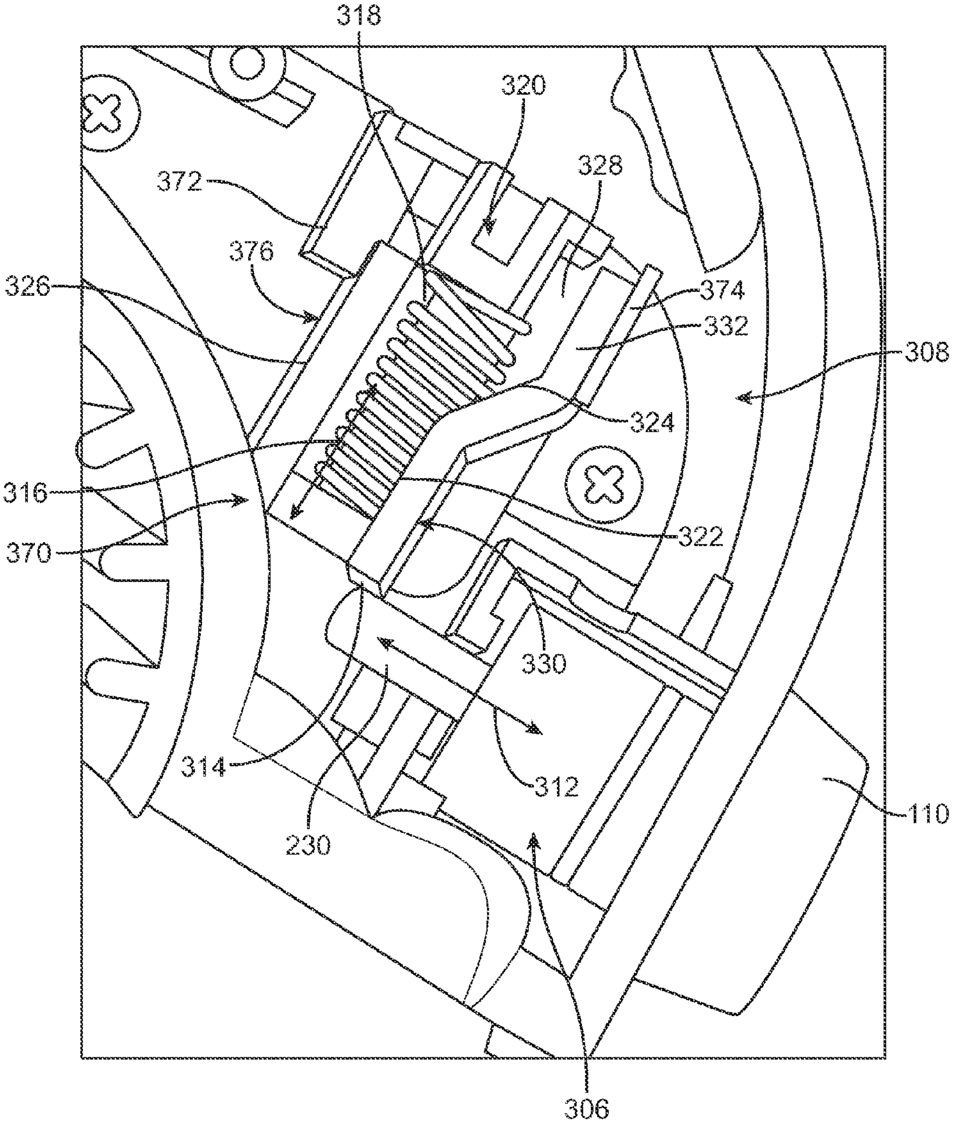
Figure 3C:
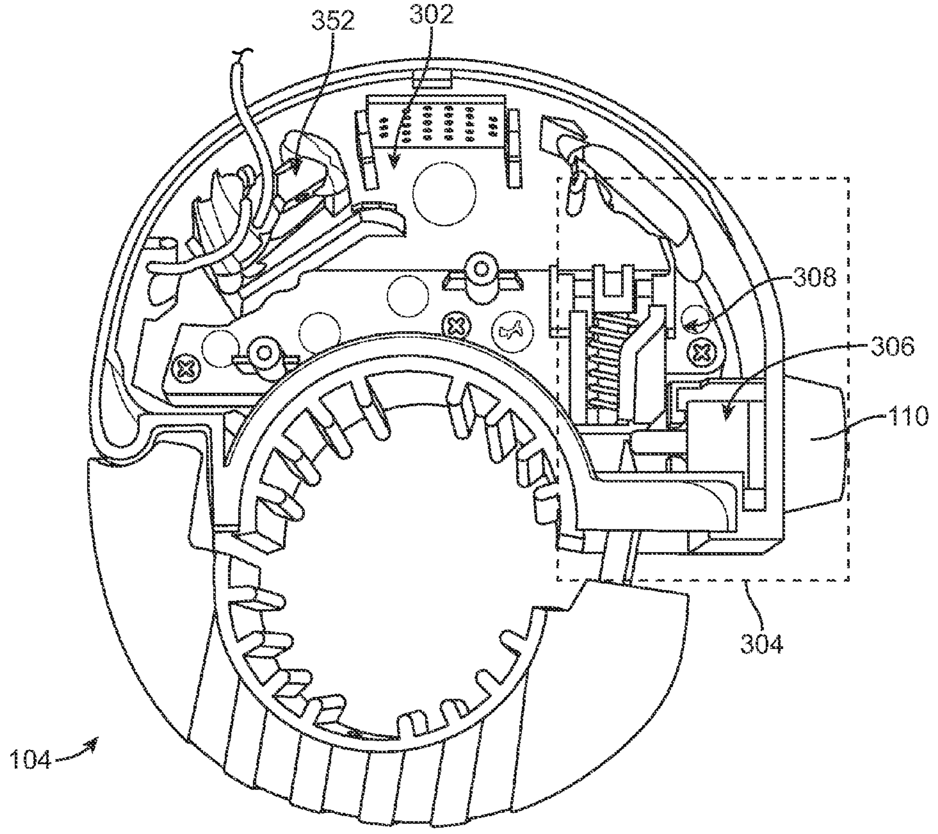
Figure 3D:
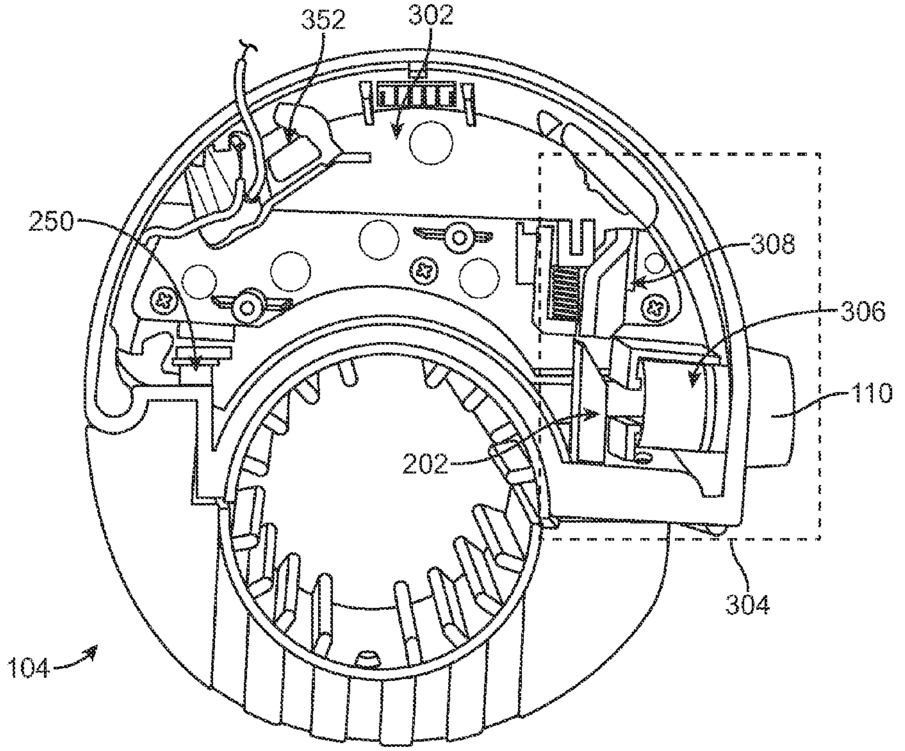

As illustrated in FIG. 3B the lock housing 306 houses the lock mechanism 348, a portions of which extends within the protuberance 110. Accordingly, the combination of the protuberance 110 and the lock housing 306 accommodate the lock mechanism 348. As best illustrated in FIG. 3F, the lock mechanism 348 includes a resilient member 360 that is integral with the locking probe 230 forming a single piece unit that forces the locking probe 230 towards the engaging element 222 to lock the engaging element 222 within the chamber 302 of the first piece 102. The resilient member 360 is formed of the elongated cylindrical probe 230 and a first and second disc cylinders 344 and 346, all of which are integrally concentric and form a single piece. The resilient member has a first biasing mechanism 362 that forces the locking probe 230 towards the engaging element 222 along a second reciprocating path 312. As progressively illustrated in FIGS. 3A to 3F, the locking probe 230 includes an engaging tip that is biased to a protruded position by the first biasing mechanism 362, contacts the leading beveled surface 226 of the engaging element 222, is progressively forced to a partially retracted position, and is eventually released back to a fully protruded position and snapped into the interlocking aperture 204 of the free leading end 202, whereby the probe 230 interlocks with engaging element 222 such that insertion into first piece 102 is allowed, but extraction is not.

To disengage the first piece 102 from the second piece 104, the locking probe 230 is retracted, released, and disengaged from the interlocked and engaged position within the interlocking aperture 204 when the force exerted by the resilient member is removed. The locking probe 230 is released and disengaged from the interlock aperture 204 when the force exerted by the resilient member (the first biasing mechanism 362) is reversed, with the reversed force pulling the locking probe 230 out and away from the interlock aperture 204, against the first biasing mechanism 362 of the lock mechanism 348. That is, to release an article, deactivate, and reset the alarm to OFF, the protuberance 110 of the EAS alarm tag 100 is brought into physical contact with well-known suitable (in terms of magnetic strength, for example) magnetic detacher that resets an internal magnetic switch 412 (FIG. 4A) located proximal thereto, enables the release and removal of the free leading end 202, and the overall disarming of the EAS alarm tag 100. The magnetic detacher magnetically pulls-in the resilient member 360 in the reciprocating path 312 against the push of the first biasing mechanism 362 (compresses the illustrated spring) to thereby pull-in the probe 230 and release the free leading end 202.

Figure 3E:
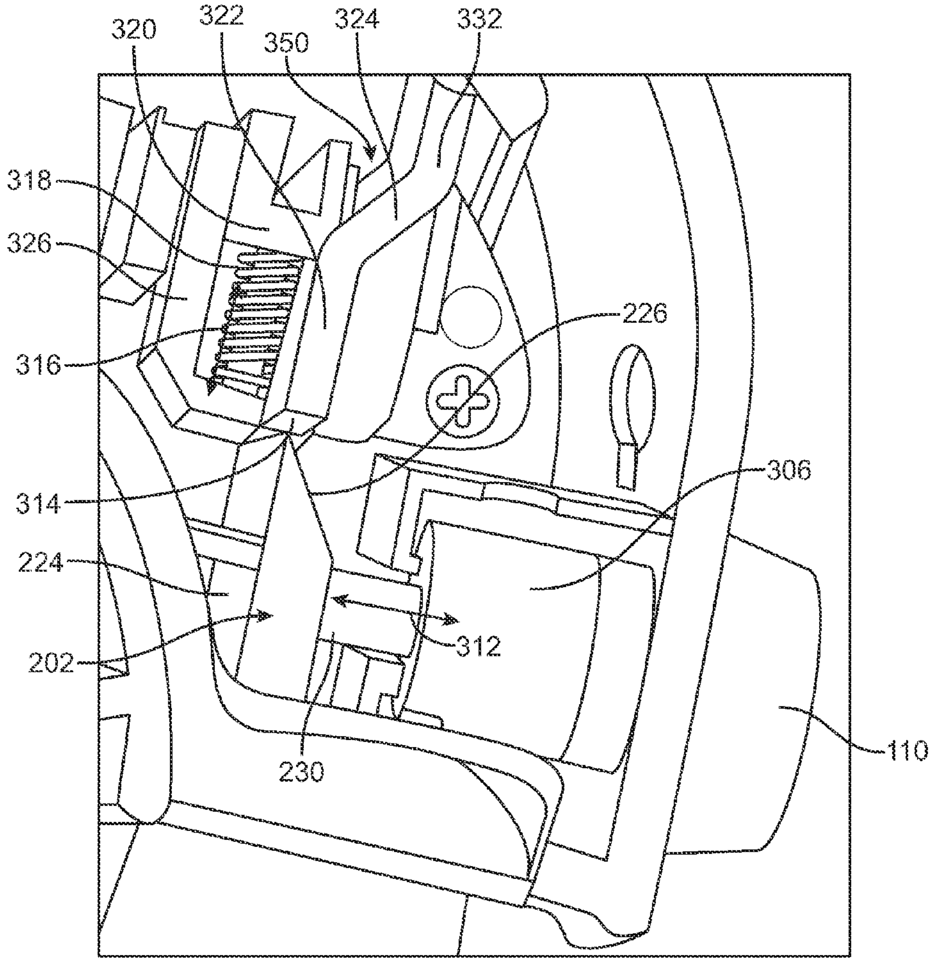
Figure 3F:
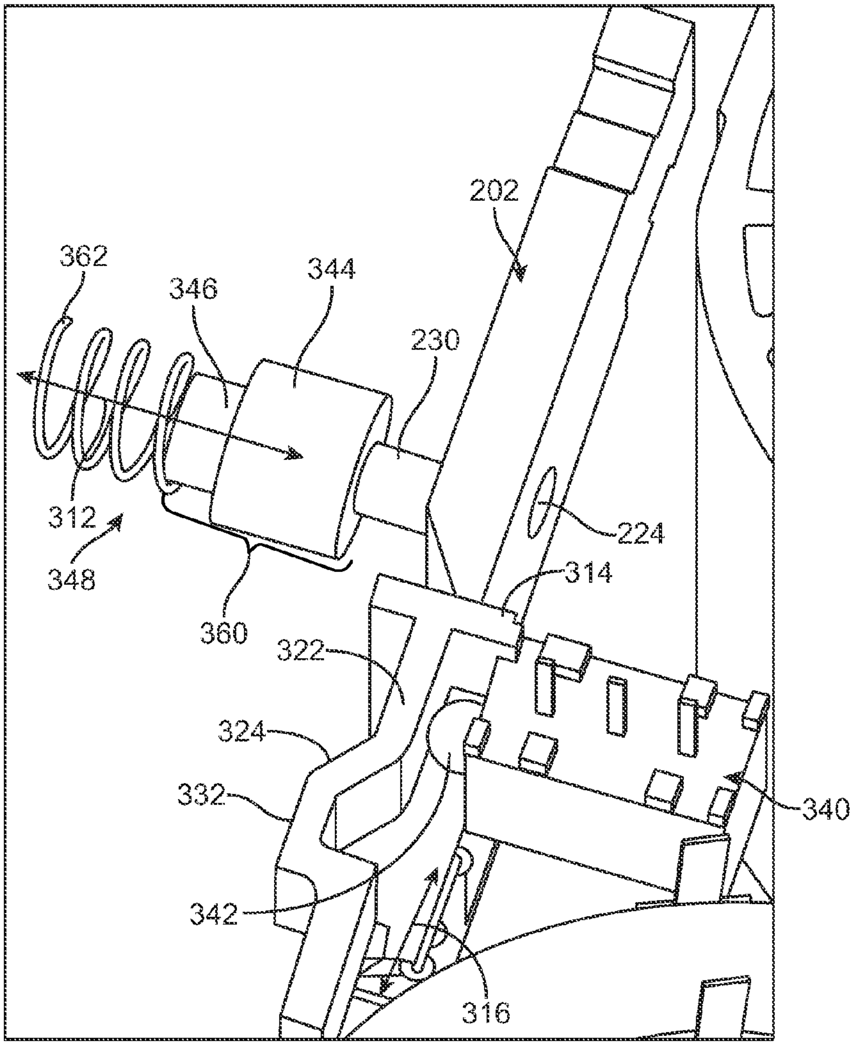

As best illustrated in FIGS. 3B, 3E, and 3F and as stated above, the chamber 302 further houses an internal actuator mechanism 308 that functions to set (or arm) the internal alarm of the EAS alarm tag 100 when the leading free end 202 of the second piece 104 is fully inserted into and interlocked within the first piece 102. As illustrated, the internal actuator 308 is normally biased to a first position by a second biasing mechanism 318, and when the beveled tip 228 of the engaging element 222 contacts the internal actuator 308 (best illustrated in FIGS. 3D to 3F), the beveled tip 228 pushes the internal actuator 308 from a first position (FIGS. 3A and 3B) to a second position (FIGS. 3D to 3F) to actuate a first arming mechanism 340 (FIG. 3F) of the EAS alarm tag 100. Non-limiting examples of the first arming mechanism 340 for arming the EAS alarm tag 100 are numerous and may include, for example, the illustrated electromechanical plunger switching system, optical devices such as a photo-sensors (e.g., photodiodes, phototransistors, etc.), Infrared (IR) sensors (e.g., IR phototransistors, etc.), light or motion sensors, magnetic or proximity sensors (e.g., Hall-effect sensors, reed switches, etc.), and so on.

The internal actuator 308 includes a structure that forms a cavity 328 that accommodates the second biasing mechanism 318. The structure includes a first stationary segment 320 that secures a first-end of the second biasing mechanism 318 and against which the first-end of the second biasing mechanism 318 is pushed and supported when the internal actuator 308 is moved along a third reciprocating path 316. The structure further includes a second movable segment 370 that secures a second-end of the second biasing mechanism 318 and against which the second-end of the second biasing mechanism 318 is pushed and supported when the second movable segment 370 of the internal actuator 308 is moved along the third reciprocating path 316.

The second movable segment 370 moves in relation to the first stationary segment 320 and includes a first wall 330 that is comprised of a first wall section 322 that is longitudinally oriented parallel along an axial length of the cavity 328, followed by a second wall section 324 oriented at an angle to the axial length of the cavity 328, and a third wall section 332 that is longitudinally oriented parallel along the axial length of the cavity 328. It should be noted that the movement of the second movable segment 370 along the third reciprocating path 316 is guided by a first and second guide flanges 374 and 372 that insert within the lateral guide grooves 376 of the second movable segment 370, with the grooves 376 oriented longitudinally parallel along the axial length of the respective first and second walls 330 and 326.

The second movable segment 370 further includes a second wall 314 that is oriented transverse the axial length of the cavity 328, against which the second-end of the second biasing mechanism 318 is pushed and supported. A third wall 326 of the second movable segment 370 is longitudinally oriented parallel the axial length of the cavity, parallel the first wall section 322. The first wall 330 (along respective first wall, second wall, and third wall sections 322, 324, 332) has a height that is longer than a height of the second and third walls, with the beveled tip 228 of the engaging element 222 contacting the second wall 314 to move the second movable segment 370 along the third reciprocating path 316, against the push of the second biasing mechanism 318 to set an internal alarm. That is, when the beveled tip 228 of the engaging element 222 contacts the internal actuator 308 (best illustrated in FIGS. 3D to 3F), the beveled tip 228 pushes the internal actuator 308 from a first position (FIGS. 3A and 3B) to a second position (FIGS. 3D to 3F) to actuate the first arming mechanism 340 (FIG. 3F) of the EAS alarm tag 100.

As best illustrated in FIG. 3F, the alarm is set (or is armed) when a first actuating arm 342 of the first arming mechanism 340 contacts the first wall section 332 of the first wall 330. That is, the alarm is set when the second movable segment 370 moves in relation to the first segment 320 along the third reciprocating path 316, with the first actuating arm 342 of the first arming mechanism 340 that is biased to a protruded position contacts an interior side 350 (FIG. 3E) of a second wall surface (the side that faces the cavity 328). The first actuating arm 342 is progressively forced to a partially retracted position when contacting the interior side 350, and is eventually closed (fully retracted to a close position to close an internal switch of the first arming mechanism 340) when contacting an interior side (facing the cavity 328) of a first wall surface as the second movable segment 370 moves from the first position to the second position. The mechanical biasing and interlocking interplay between various components (the engaging element 202, the probe 230, the first and second biasing mechanism 360 and 318, the second movable segment 370, etc.) generate a holding strength that is increased under tensile forces that attempt to separate the components from their interlocking positions, securely locking the EAS alarm tag 100 around an article to be protected.

Referring back to FIGS. 2A and 3A, 3C, and 3D, and also now FIGS. 4A and 4B, and as stated above, the first piece 102 of the EAS alarm tag 100 includes the first opening 204 (FIG. 2A) defined through the first section 270 at the third distal end 212, and has the second section 272 at the first distal end 216 that includes the second opening 250 (best illustrated in FIGS. 2A and 4A) that accommodates a detector mechanism 404 (FIG. 4A). The detector mechanism 404 accommodated in the second opening 250 of the first piece 102 is a second arming mechanism that has the second arming actuator 208 extending out of the second opening 250. The actuator mechanism 210 at the third section of the second piece 104, proximal the second distal end 218, when closed, pushes against the second arming actuator 210 extended out of the second opening 250 to arm an alarm.

FIG. 4A is an exemplary exploded view of the EAS alarm tag illustrated in FIGS. 1A to 3F, showing the separated parts embraced by a bracket in accordance with the present invention. FIG. 4A is used to better illustrate the cooperative relationships (in terms of structure and function) of the various components used in the EAS alarm tag 100, including various electronic, electromechanical, and mechanical components. A top 504 of the first piece 102 is illustrated as removed and set-aside to the right of the FIG. 4A and the internal components that are accommodated in the chamber 302 are illustrated in the center of FIG. 4A. The illustrated internal components (in both FIGS. 4A and 4B) correctly reflect relative locations and/or directions/orientations between various portions of the components, including those, which are on a Printed Circuit Board (PCB) 420 when the device is finally fully assembled.

As illustrated in FIGS. 4A and 4B and described above, the EAS alarm tag 100 of the present invention is comprised of the first piece 102 that is coupled with the second piece 104 by a metal hinge pin 502. The illustrated empty chamber 302 of the first piece 102 includes the first opening 204 and the second opening 250 (at the opposite end of the chamber 302 from the first opening 204). The exterior surface of the first piece 102 includes the perforated areas 118 that form grill-openings for output of an audio indicator sound by a transducer 410 juxtaposed adjacent the grill-opening 118 and a visual indicator aperture 406 for viewing of the visual indicator device 116 in the exemplary form of a Light Emitting Diode (LED), with the tip of the LED extended out of the aperture 406. The EAS alarm tag 100 further includes a power source 408 in the form on an exemplary battery to power all electronics therein.

As described above, the free leading end 202 of the second piece 104 is inserted through the first opening 204 to interlock the second piece 104 within the first piece 102. As shown in FIG. 4A, the interlock mechanism 348 is oriented transverse the free leading end 202 as illustrated and partially housed within the external protuberance 110 with its probe 230 interlocking with the aperture 224 of the free leading end 202.

As shown in FIG. 3F, the first actuating arm 342 of the first arming mechanism 340 is oriented towards the actuator 308 to thereby be set or reset as the free leading end 202 pushes against the actuator 308 to move it from the first to the second position. Both FIGS. 3F and 4A illustrate the orientation of the first arming mechanism 340, which is transverse the free leading end 202, with first actuating arm 342 oriented facing the actuator 308.

As further illustrated in FIG. 4A, the second piece 104 includes the actuator mechanism 210 that actuates the detector mechanism 404 that is positioned within the chamber 302. The second actuating arm 208 of detector mechanism 404 is oriented as shown so that it protrudes out of the second opening 250 when housed within chamber 302, with the actuator mechanism 210 aligned to contact and actuate the second actuating arm 208 of the detector mechanism 404 when the first and the second pieces 102 and 104 are interlocked and closed, which sets (or arms) the alarm system of the EAS alarm tag 100.

As further illustrated in FIG. 4A, the EAS alarm tag 100 of the present invention further includes an EAS device 352 that may be construed as a triggering unit that senses and generates surveillance signals to trigger an alarm. The non-limiting examples of EAS device 352 may include a magnetically sensitive device, a Radio Frequency (RF) sensitive device, or others. A non-limiting example of a magnetic sensitive device is a signal detector in the form of a ferrite coil, and a non-limiting example of the surveillance signal may be a magnetic signal that is detected by the ferrite coil. Ferrite coils (and EAS devices in general) are well-known, and can have various configurations, including different types of coil configurations (for a ferrite coil). It should be noted that an EAS device may actuate or trigger the alarm of the EAS alarm tag 100 as well as actuating an external security system such as a security gate alarm (e.g., a security pedestal) when it detects a surveillance signal.

FIG. 4A also exemplarily illustrates a well-known magnetic switch 412 near the first arming mechanism 340, non-limiting example of which may include a hall, reed, or any other magnetic or proximity switches or any combinations thereof. When closed, the magnetic switch 412 resets (disarms) the alarm system and when open, maintains the status quo. To release an article, deactivate, and reset the alarm to OFF, EAS alarm tag 100 is brought into contact with well-known suitable (in terms of magnetic strength, for example) magnetic detacher that resets the internal magnetic switch 412, enables the release and retraction of the probe 230 and removal of the free leading end 202, and the overall disarming of the EAS alarm tag 100. The logic and alarm circuits of the EAS alarm tag 100 are controlled by a microprocessor, which makes the EAS alarm tag 100 intelligent, flexible and adaptable to various requirements.

As has been described and illustrated, the EAS alarm tag 100 includes a plurality of independent mechanical and electrical circuitry, include the magnetic switch 412 (as a first input unit) that has associated with it a first independent mechanical and electrical circuitry, the first arming mechanism 340 (as a second input unit) that has associated with it a second mechanical and electrical circuitry, the substantially inconspicuous detector mechanism 404 (as a third input unit) that has associated with it a third mechanical and electrical circuitry and finally, the EAS device 352 (as a fourth input unit) that has associate with it a fourth mechanical and electrical circuitry.

Figure 5A:
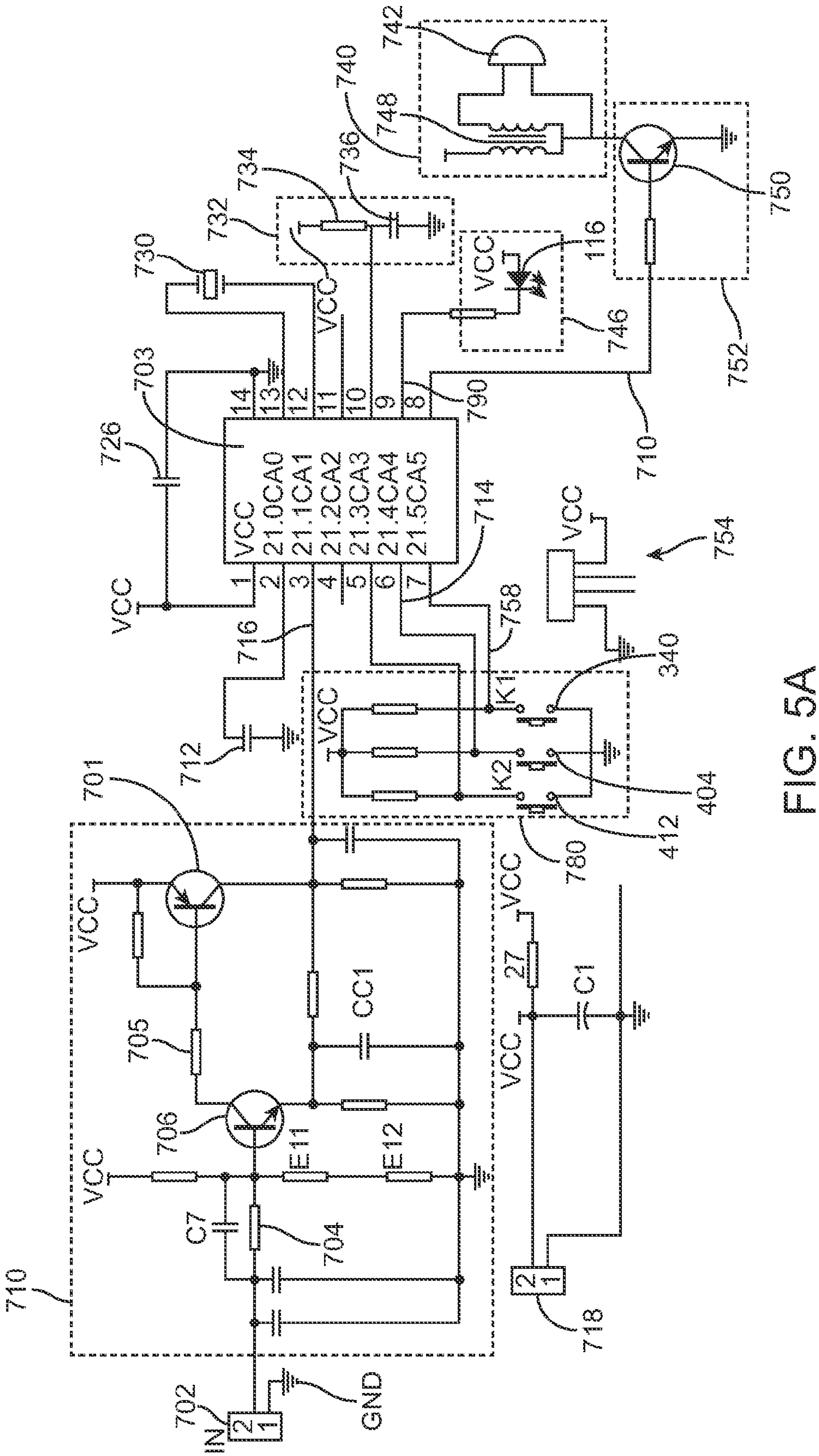
FIGS. 5A and 5B are exemplary schematic illustrations of the alarm system of the present invention, including all input and output units and their respective associated circuitry in accordance with the present invention.
Figure 5B:
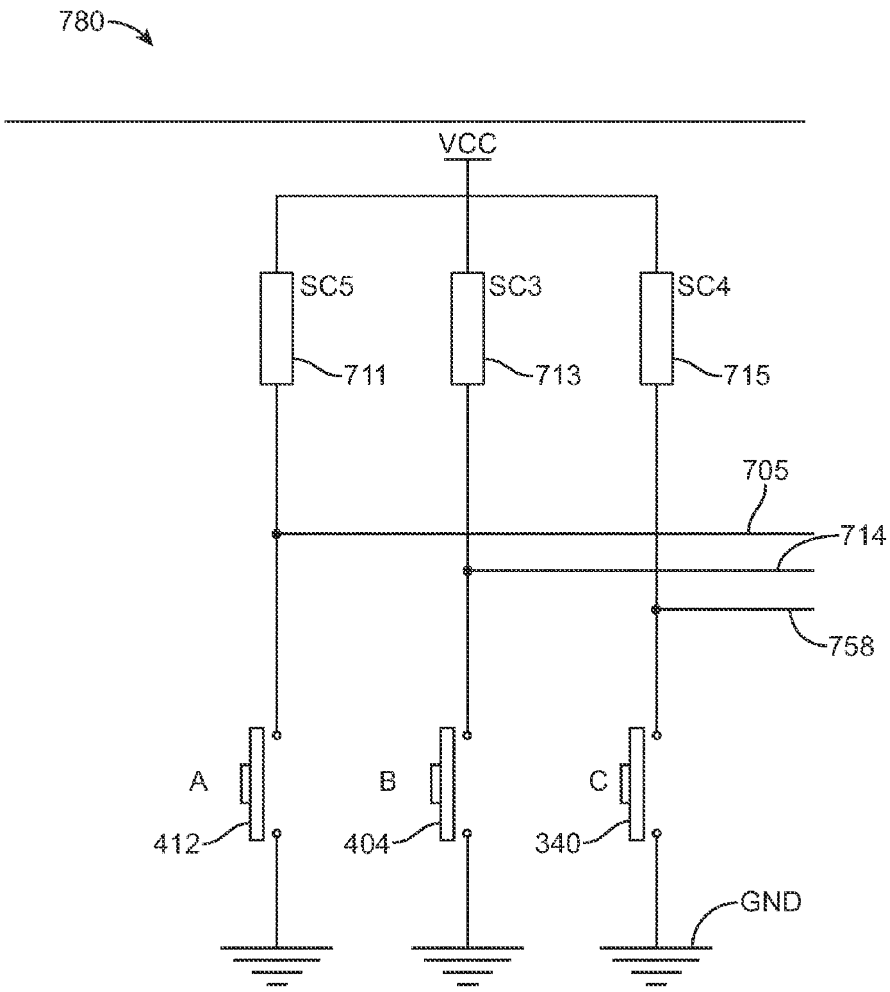

FIGS. 5A and 5B are exemplary schematic illustrations of the alarm system of the present invention, including all input and output units and their respective associated circuitry. In FIG. 5A, the dashed line indicated as reference 780 is best illustrated in FIG. 5B, which represents the first arming mechanism 340 (and the associated free leading end 202, the lock mechanism 348, and the actuator 308), the detector mechanism 404 (with the associated actuator mechanism 210), and the magnetic switch 412. As illustrated in FIGS. 5A and 5B, to activate the EAS alarm tag 100, the free leading end 202 of the second piece 104 is inserted through the aperture 204 within the chamber 302, with the beveled tip 228 contacting the actuator 308, which in turn, closes the first arming actuator 342 of the first arming mechanism 340 to close switch "C," with the "switch C" in FIGS. 5A and 5B representing the leading free end 202, the lock mechanism 348 that maintains the leading free end 202 in closed interlocked position with first piece 102, the actuator 308, and the first arming mechanism 340. The closing of the "switch C" (or the actuation of the first arming actuator 342 of the first arming mechanism 340) pulls to ground the power Vcc at one end via a current limiting resistor 715. When the switch C is closed, the output of the first arming mechanism 340 is pulled low and set to "0," and inputted to a first input line 758 of one or more input lines of a microprocessor 703 for activation (or arming) of the alarm device of the EAS alarm tag 100. It should be noted that the switch C is virtual and is for illustrative purpose only. Switch C is used to only represent the open and closed circuit conditions of the mechanical, electromechanically, and electronic circuitry associated with the first input unit (e.g., the leading free end 202, the lock mechanism 348 that maintains the leading free end 202 in closed interlocked position within the first piece 102, the actuator 308, and the first arming mechanism 340).

As illustrated in FIGS. 5A and 5B, the "switch B" represents the inconspicuous detector mechanism 404 (and the actuator mechanism 210), the combination of which may be thought of as a secondary, auxiliary arming switch. To activate (or arm) the EAS alarm tag 100, the second actuating arm 208 of the detector mechanism 404 is pushed in by the actuator mechanism 210 when the first piece 102 is closed and interlocked with the second piece 104. The movement of the second actuating arm 208 closes the switch B, the closure of which completes a circuit for setting (or arming) the alarm system of the EAS alarm tag 100. The closing of the switch B pulls to ground the power Vcc at one end via a current limiting resistor 713. When the switch B is closed, the output of switch B is pulled low and set to "0," and inputted to a second input line 714 of one or more input lines of a microprocessor 703 for activation (or arming) of the alarm device of the EAS alarm tag 100. The "switch A" illustrated in FIGS. 5A and 5B represents the switch magnetic switch 412 (illustrated in FIG. 4A). When the EAS alarm tag 100 is brought into contact with the magnetic detacher, the magnetic switch 412 is reset (or closed—the representative "switch A" closes, with line 705 pulled to low or "0"). This enables the alarm system to be reset, deactivating the entire alarm system to OFF (if switch 340 is open and the switch 404 is open). Open switches "A" and "B" respectively represent the open and out condition of free leading end 202 and second actuating arm 208.

As further illustrated in FIGS. 5A and 5B, the alarm system includes a general-purpose microprocessor 703 mounted onto the PCB 420 with an internal memory (e.g., an EEPROM) that includes a set of instructions. The microprocessor 703 receives one or more input signals from one or more input periphery devices and generates one or more processed output signals for actuation of one or more periphery output devices. The processing of data may include Analog to Digital (A/D) or D/A conversion of signals, and further, each input or pin of the microprocessor 703 may be coupled with various multiplexers to enable processing of several multiple input signals from different input periphery devices with similar processing requirements. Non-limiting examples of one or more input periphery devices may exemplarily include the first arming mechanism 340, the inconspicuous auxiliary second arming mechanism (or the detector mechanism) 404, the magnetic switch 412, and the EAS device 352. Non-limiting examples of one or more output periphery devices may exemplarily include the use of vibration mechanisms, audio, visual or any other indicators to alarm and notify a user regarding an occurrence.

As exemplarily illustrated in FIG. 5A, the EAS alarm tag 100 may use a first input periphery device in the form of the electronic article surveillance (EAS) device 352 coupled with an EAS connector 702. As illustrated, a first output of the EAS connector 702 is coupled with ground GND, and a second output of the EAS connector 702 is coupled with an amplifier 710 to generate an amplified signal from the EAS device 352. The amplifier 710 increases the signal strength form a ferrite unit of the EAS device 352 sufficiently for further processing by the alarming circuit. The amplifier 710 is comprised of current limiting resistors 704 and 705 that limit the current input to the base of the respective transistors 706 and 701, with the transistor 706 in combination with the transistor 701 functioning to amplify the signal (current and voltage) from EAS connector. The transistors 706 and 701 are comprised of an exemplary Bipolar Junction Transistors (BJT). It should be noted that present invention should not be limited to the amplifier 710 illustrated, and other conventional amplifiers may also be used. Further, the amplification need not be performed by the BJT, but can be done by other transistors, such as Metal Oxide Semiconductors (MOS) or MOS field effect transistors (MOSFETS), operational amplifiers, transformers, or the like, other passive or active devices, or any combinations thereof.

The amplifier 710 amplifies the output of the EAS device 352, and the amplified signal (from the collector of the transistor 701) is input to the microprocessor 703 via the input line 716 as one of one or more input signals, where the microprocessor 703 converts the analog amplified signal into a digital signal for processing. This signal is translated by the instructions (algorithm) within the EEPROM of the microprocessor 703 to determine if the signal came from the transmitters (pedestals); if so, the microprocessor 703 trigger the alarm (e.g., audio and or visual indicators). It should be noted that one or more of the one or more processed output signals may be pulsed output signals on output lines to one of the one or more periphery output devices, for example, output line 710 for actuation of a transducer unit 740 to generate an audio alarm signal.

The transducer unit 740 is actuated by an amplified pulsed output signal that is output from the microprocessor 703 via line 710, and further amplified by an output amplifier 752. The output amplifier 752 is comprised of a BJT transistor 750 with an emitter coupled to ground, a collector coupled to a transformer 748 of the transducer 740, and a base that is coupled with a current limiting resistor. The transistor 750 amplifies the pulsed output signal from line 710 to alternately drive the transformer from high Vcc to ground and vice versa, with the transformed pulsed signal driving a ceramic transducer 742 to generate an audible alarm. It should be noted that well-known software routine within the microprocessor 703 may generate this pulsed output, which is amplified by the transistor 750. In addition to the generation of an audible alarm, as further illustrated, other output periphery devices may include the use of a visual indicator 746 that use LEDs 116 to notify users of an occurrence. The visual indicator 746 is coupled with line 790 of the microprocessor 703. As indicated above, other output periphery devices not illustrated may also easily be accommodated and connected with the microprocessor 703.

As further illustrated, pins 1 and 14 of the microprocessor 703 are respectively coupled to Vcc and ground GND via a filter capacitor 726, which power the microprocessor 703. The power is supplied to the power connector 718 (by the power source 408) and provided as the power Vcc to the circuit. The microprocessor 703 is further coupled via its pin 2 to ground through another filter capacitor 712. The crystal 730 coupled to pin 13 is used to facilitate a clocking signal to the microprocessor 703. That is, it stabilizes the frequency of the clock in the microprocessor 703. Pins 10 and 11 are respectively for reset and test of the microprocessor 703, which is through a connector 754 that enables the testing and reset of the microprocessor 703. The testing and reset enable determination of signaling of the microprocessor 703, for example, to determine if the microprocessor 703 functions based on "0" or "1" input signal level to trigger a device. In this exemplary instance, the microprocessor 703 will trigger an output periphery device when the input is pulled to high (or "1"). For example, when the switch 340 and/or 404 is opened, the open circuit condition pulls the line 714 to Vcc (high or "1"), which triggers an alarm. The reset pin 10 is coupled with the reset circuit 732, which includes a current limiting resistor 734 that is coupled at one end to Vcc and other end to a capacitor 736, with the other end of the capacitor 736 coupled to ground. The reset pin 10 is coupled at the junction of the resistor 734 and capacitor 736.

Figure 6:
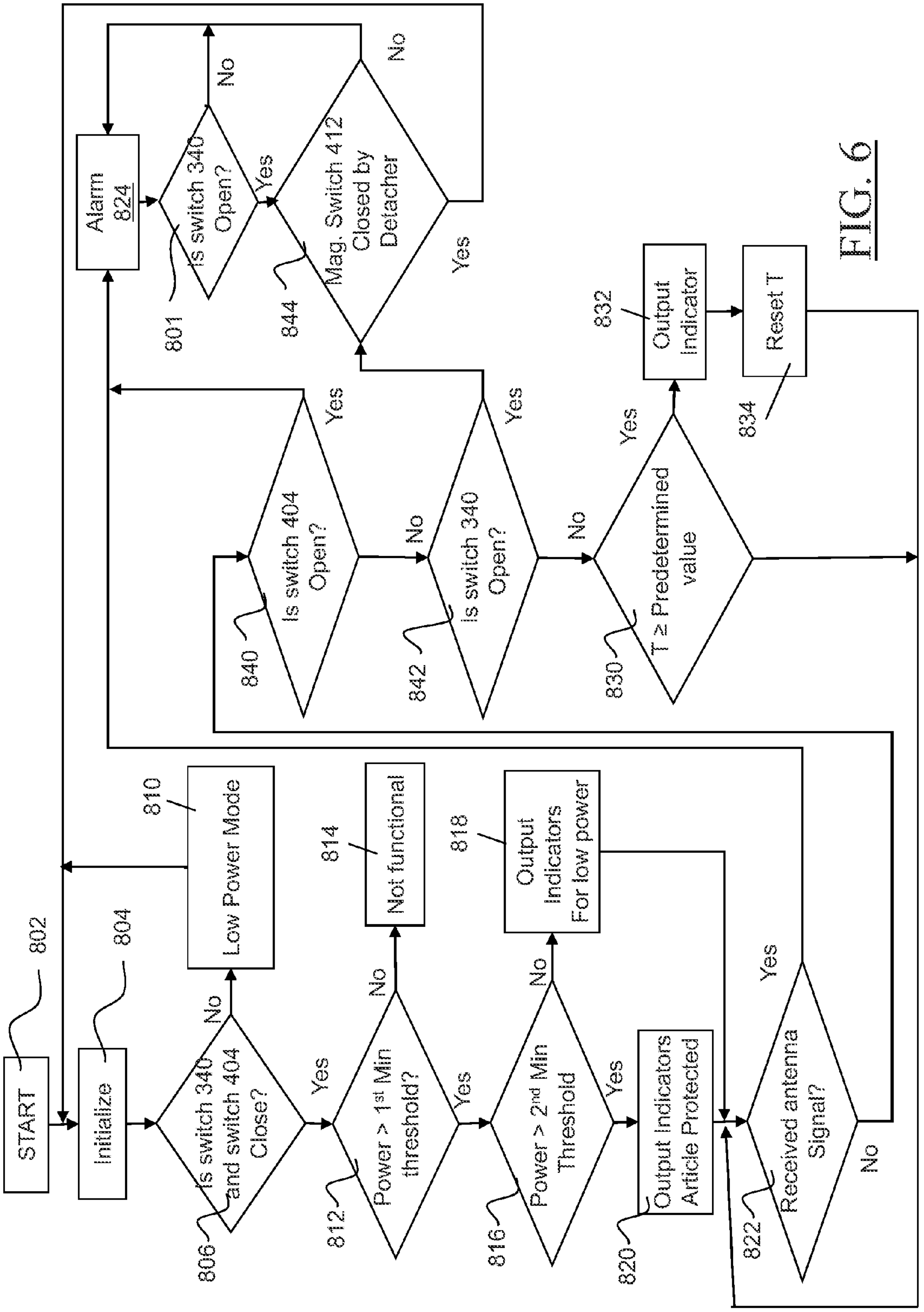
FIG. 6 is an exemplary flowchart, which illustrates the power management and functionality of a microprocessor of the EAS alarm tag in accordance with the present invention.

FIG. 6 is an exemplary flowchart, which illustrates the power management and functionality of the microprocessor 703 of the EAS alarm tag 100. As illustrated, upon start of the program at the operational act 802, the microprocessor 703 initializes at the operational act 804. At the next operational act 806 the microprocessor 703 determines if the switches 340 and 404 (FIGS. 5A and 5B) are closed. If at the operational act 806 it is determined that the switches 340 and 404 are not closed, the microprocessor 703, at operational act 810, outputs a low power mode operational signal (e.g., sleep mode), with the operation reverting to initialization at operational act 804. If the microprocessor 703 determines that the switches 340 and 404 are closed, then at the operational act 812 the microprocessor 703 determiners if supplied power is greater than a first threshold level. If at the operational act 812 it is determined that supplied power is not greater than a first threshold level, the device becomes non-functional. Otherwise, if at the operational act 812 the microprocessor 703 determines that supplied power is greater than the first threshold, the microprocessor 703, at the operational act 816, determines if the supplied power is greater than a second threshold level, with the second threshold level being greater than the first threshold level. If the microprocessor 703 determines that the supplied power is not greater than a second threshold level, the microprocessor 703 at the operational act 818 activates various output periphery units in a predetermined manner to indicate low supply of power, but continues and arms the EAS alarm tag 100 to protect an article. If the microprocessor 703 determines that the supplied power is greater than the second threshold level, the EAS alarm tag 100 is set (or armed), and various indicators are activated to indicate to users that the article is protected.

To continue with the flowchart of FIG. 6, the microprocessor 703 at the operational act 822 determines if an antenna signal is received from associated EAS equipment. If the microprocessor 703 determines that an antenna signal is received, at the operational act 824, the microprocessor 703 activates (or triggers) an alarm. A non-limiting example for such an alarm incident (or condition) is the actual removal of the article to which the EAS alarm tag 100 is connected from a store, passing them through a surveillance zone. This will activate the EAS device 352 to trigger a signal, which will be amplified and input to the microprocessor to activate (or trigger) the alarm.

At the operational act 801 the microprocessor 703 determines if the switch 340 is open. If it is determined that the switch 340 is not open, then may be an authorized person is in the process of properly disarming the EAS alarm tag 100 after an alarm incident at the operational act 824. That is, the EAS alarm tag 100 and the article to which the tag 100 is coupled are brought to an authorized store personal to be properly disarmed (after an alarm trigger), with the switch 340 still closed. On the other hand, at the operational act 801 it may be determined that the switch 340 is open (after the alarm incident at operational act 824, which may not have been due to the reception of the antenna signal at operational act 822). A non-limiting exemplary reason for checking to determine if the switch 340 is open at the operational act 801 after an alarm incident (at the operational act 824) is that, may be an unauthorized person has tampered with the EAS alarm tag 100, tampering forcing the free leading end 202 of the second piece 104 out of the first piece 102 to eventually open switch 340. In the case where the switch 340 is open, the operational act 844 is executed where the microprocessor 703 determines if the magnetic switch 412 is closed by the magnetic detacher. That is, for example, the switch 340 is open (either by an authorized person or is tampered), and the microprocessor 703 now determines if the magnetic switch 412 of the EAS alarm tag 100 is closed by the magnetic detacher. In other words, has an authorized personal properly neutralized the magnetic switch 412 to initialize the EAS alarm tag 100 using the magnetic detacher. If so, then the EAS alarm tag 100 and its microprocessor 703 initialize (i.e., execute operational act 804). That is, the first piece 102 is opened in relation to the second piece 104, the switch 340 is open, the EAS alarm tag 100 is properly neutralized wherein the microprocessor 703 reverts to the operational act 804. Otherwise, the EAS alarm tag 100 continuously alarms. That is, at the operational act 801 it is determined that the switch 340 is open (e.g., is tampered or is in the process of proper disarming), and the magnetic switch is still not closed.

Referring back to the operational act 822, if the microprocessor 703 determines that no antenna signal was received at the operational act 822, the microprocessor 703, at the operational act 840 determines if the switch 404 is open (i.e., has the first piece 102 of EAS alarm tag 100 been disconnected from the second piece 104 via the pin 502 side such that the detector mechanism 404 is triggered). In other words, the EAS alarm tag 100 is tampered, with the first and second pieces 102 and 104 separated at the hinged ends, exposing the detector mechanism 404. If the microprocessor 703 determines that the switch 404 is open, then the EAS alarm tag 100 is tampered and the alarm is triggered at the operational act 824. On the other hand, if the microprocessor 703 determines that the switch 404 is closed (no tampering), but the switch 340 is opened, then the operational act 844 is executed where the microprocessor 703 determines if the magnetic switch 412 is closed by the magnetic detacher. In this instance, the open condition of the switch 340 is not so much a tampering, but may be a proper disarming of the EAS tag 100 to detach it from an article. It should be noted that when the microprocessor 703 receives no antenna signal (operational act 822), and the switch 404 is closed (no tampering, operational act 840), but if the switch 340 is determined to be open (operational act 842), then the alarm at the operational act 824 is not triggered. A non-limiting exemplary instance of this scenario would be that the article with the EAS alarm tag 100 attached thereto is brought to a checkout counter of a retain store, and is properly disarmed by the magnetic detacher. That is, the magnetic detacher opens the switch 340 (the open condition of operation act 842) and closes the magnetic switch 412 (closed condition of the operational act 844).

However, if at the operational acts 840 and 844 the microprocessor 703 determines that the switch 404 and the switch 340 are closed, at functional act 830 a determination is made regarding a timer to determine if a predetermined time has been reached. If at functional act 830 it is determined that a predetermined time has elapsed, an indicator is output and the timer is reset, where the microprocessor 703 then repeats operational functional act 822, which is to determine if an antenna signal has been received. The output indicator 832 is an audio and or visual indicator that enables a user to determine if the EAS alarm tag 100 is properly armed. The microprocessor 703 output a visual and or audio indicator periodically (while the EAS alarm tag 100 is armed) at specified predetermined time intervals T.

Although the invention has been described in considerable detail in language specific to structural features and or method acts, it is to be understood that the invention described and shown in the drawings should not be limited to the specific features or acts described and shown. Rather, the specific features and acts are disclosed as preferred forms of implementing the invention. Stated otherwise, it is to be understood that the phraseology, terminology, and various measurements employed herein (and shown in drawings) are for the purpose of description and should not be regarded as limiting. Therefore, while exemplary illustrative embodiments of the invention have been described and shown, numerous variations and alternative embodiments will occur to those skilled in the art. For example, a substantially thicker protective friction pad may be used that would reduce the size of the enclosure 108 for use to protect smaller merchandise, non-limiting examples of which may include Golf Clubs, Fishing Rods, and Electronic Appliances (tag wraps around power cables). As yet another example, a substantially thinner protective friction pad may be used that would increase the size of the enclosure 108 for use to protect larger merchandise, non-limiting examples of which may include liquor and wine bottles, bags, luggage, and etc. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. An anti-theft tag, comprising:

a housing comprised of a first piece and a second piece movably coupled with one another, forming an enclosure;

a marker accommodated within the housing; and wherein:

the first piece and the second piece enclose to define a hole for encompassing and securing an article therein the hole;

the respective first and the second pieces are pivotally coupled by a hinge mechanism that allows rotation of the respective pieces along a first reciprocating path;

the first piece includes a first opening defined through a first section at a third distal end;

the first piece further includes a second section at the first distal end that includes a second opening that accommodates a detector mechanism;

the second piece includes an actuator mechanism at a third section proximal the second distal end that actuates the detector mechanism;

the second piece further includes a free leading end at a fourth section at a fourth distal end that is inserted within and received by the first opening;

with the detector mechanism of the first piece and the actuator mechanism of the second piece aligned proximal the hinge mechanism at the respective first distal end of the first piece and the second distal end of the second piece;

when the first piece and the second piece move along the first reciprocating path and close, the actuator mechanism actuates the detector mechanism; and the detector mechanism accommodated in the second opening of the second section of the first piece is a second arming mechanism that has a second arming actuator extending out of the second opening, and the actuator mechanism at the third section of the second piece, proximal the second distal end, when closed, actuates the second arming actuator extended out of the second opening to arm an alarm.

2. The anti-theft tag as set forth in claim 1, wherein:

the first piece and the second piece have a substantially arced configuration that enclose to define a substantially cylindrical hole.

3. The anti-theft tag as set forth in claim 1, wherein:

the hinge mechanism is comprised of a set of integrally circular, hollow sections that form knuckles of the hinge mechanism, with the knuckles integral with a first distal end of first piece;

a hinge barrel integral with a second distal end of the second piece;

wherein the hinge barrel is axially aligned in between the knuckles, through which a hinge pin in inserted to couple the knuckles with the hinge barrel to form the hinge mechanism;

wherein the hinge pin inserted through the hollow knuckles at a distal open end of the first piece, the through-hole of the barrel, and into a closed end of the first piece.

4. The anti-theft tag as set forth in claim 2, wherein:

a protective friction pad is coupled with the housing for minimizing movement of the anti-theft tag in relation to an associated article.

5. The anti-theft tag as set forth in claim 4, wherein:

the protective friction pad is comprised of a first friction pad coupled with the first piece and a second friction pad coupled with the second piece.

6. The anti-theft tag as set forth in claim 5, wherein:

the protective friction pad includes a top surface that is striated, having parallel, protruded strips with axial lengths that are longitudinally parallel along a central axial length of the cylindrical hole for an improved grip of the associated article.

7. The anti-theft tag as set forth in claim 1, wherein:

an exterior surface of the first piece includes perforated areas that form grill-openings for output of an audio indicator sound, a visual indicator aperture for viewing of a visual indicator device, and a protuberance in a form of a frustum of a right-circular cone that houses a lock mechanism for locking the second piece with the first piece.

8. The anti-theft tag as set forth in claim 1, wherein:

the free leading end is an engaging element that includes an interlocking aperture into which a locking probe of a lock mechanism is received and has a leading beveled surface that converges into a beveled tip that facilitates coupling of the free leading end with the first piece.

9. The anti-theft tag as set forth in claim 8, wherein:

the free leading end is inserted into the first opening defined through the first section at the third distal end of the first piece, with the locking probe of the lock mechanism interlocked with the interlocking aperture of the free leading end.

10. The anti-theft tag as set forth in claim 9, wherein:

the first piece further includes a chamber that accommodates and locks the free leading end of the second piece;

the chamber accommodates the lock mechanism that interlocks with the free leading end of the second piece;

the lock mechanism is partially housed within a protuberance, in a form of a frustum of a right-circular cone, locking the second piece with the first piece.

11. The anti-theft tag as set forth in claim 10, wherein:

the lock mechanism includes:

a resilient member that is integral with the locking probe that forces the locking probe towards the engaging element to lock the engaging element within the chamber of the first piece;

the resilient member includes a biasing mechanism that forces the locking probe towards the engaging element;

the locking probe includes an engaging tip that is biased to a protruded position, contacts the leading beveled surface of the engaging element, is forced to a partially retracted position, and is eventually released to a fully protruded position into the interlocking aperture of the free leading end, whereby the engaging tip interlocks with the engaging element such that insertion into first piece is allowed, but extraction is not.

12. The anti-theft tag as set forth in claim 11, further including:

a disengagement arrangement, wherein:

the locking probe is retracted, released, and disengaged from the interlocked and engaged position within the interlocking aperture when the force exerted by the resilient member is removed;

the locking probe is released and disengaged from the interlocking aperture when the force exerted by the resilient member is reversed, with the reversed force pulling the locking probe out and away from the interlocking aperture, against the biasing mechanism of the lock mechanism.

13. The anti-theft tag as set forth in claim 11, further including:

an internal actuator that is biased to a first position;

the beveled tip of the engaging element contacts the internal actuator, pushing the internal actuator from the first position to a second position to actuate a first arming mechanism of the tag.

14. The anti-theft tag as set forth in claim 13, wherein:

the internal actuator includes a structure that forms a cavity that houses a biasing mechanism;

the structure includes a first segment that secures a first-end of the biasing mechanism and against which the first-end of the biasing mechanism is pushed and supported when the internal actuator is moved along a third reciprocating path;

the structure further includes a second movable segment that secures a second-end of the biasing mechanism and against which the second-end of the biasing mechanism is pushed and supported when the second movable segment of the internal actuator is moved along the third reciprocating path;

the second movable segment moves in relation to the first segment and includes:

a first wall that includes:

a first wall section that is longitudinally oriented parallel along an axial length of the cavity, followed by a second wall section oriented at an angle to the axial length of the cavity;

and a third wall section that is longitudinally oriented parallel along the axial length of the cavity;

a second wall that is transversely oriented the axial length of the cavity, against which the second-end of the biasing mechanism is pushed and supported;

a third wall that is longitudinally oriented parallel the axial length of the cavity;

the first wall has a height that is longer than a height of the second and third walls, with the beveled tip of the engaging element contacting the second wall to move the second movable segment along the third reciprocating path to set the alarm.

15. The anti-theft tag as set forth in claim 14, wherein:

the alarm is set when a first actuating arm of the first arming mechanism contacts the first wall.

16. The anti-theft tag as set forth in claim 15, wherein:

the alarm is set when the second movable segment moves in relation to the first segment along the third reciprocating path, with the first actuating arm of the first arming mechanism that is biased to a protruded position contacts an interior side of a second wall surface is progressively forced to a partially retracted position, and is eventually closed when contacting an interior side of a first wall surface as the second movable segment moves from the first position to the second position;

wherein the biasing mechanism and interlocking interplay between the locking probe of the lock mechanism and the interlocking aperture of the free leading end generate a holding strength that is increased under tensile forces that attempt to separate the lock mechanism and the free leading end from interlocking positions.

* * * * *